US010956488B2

(12) United States Patent
Smart

(10) Patent No.: US 10,956,488 B2
(45) Date of Patent: Mar. 23, 2021

(54) IMAGE TILE REQUEST SERVICE

(71) Applicant: Rosemount Aerospace Limited, Malvern (GB)

(72) Inventor: Gary Smart, Somerton (GB)

(73) Assignee: ROSEMOUNT AEROSPACE LIMITED, Malvern (GB)

( * ) Notice: Subject to any disclaimer, the term of this patent is extended or adjusted under 35 U.S.C. 154(b) by 44 days.

(21) Appl. No.: 16/287,129

(22) Filed: Feb. 27, 2019

(65) Prior Publication Data

US 2019/0294628 A1 Sep. 26, 2019

(30) Foreign Application Priority Data

Mar. 26, 2018 (EP) ..................................... 18163983

(51) Int. Cl.
| | | |
|---|---|---|
| *H04N 1/64* | (2006.01) | |
| *G06F 16/583* | (2019.01) | |
| *G06F 16/51* | (2019.01) | |
| *G06F 16/58* | (2019.01) | |
| *G06F 16/54* | (2019.01) | |
| *H04L 29/08* | (2006.01) | |

(52) U.S. Cl.
CPC ............ *G06F 16/583* (2019.01); *G06F 16/51* (2019.01); *G06F 16/54* (2019.01); *G06F 16/5866* (2019.01); *H04L 67/02* (2013.01)

(58) Field of Classification Search
None
See application file for complete search history.

(56) References Cited

U.S. PATENT DOCUMENTS

| | | | |
|---|---|---|---|
| 7,734,412 B2 | 6/2010 | Shi et al. | |
| 9,305,362 B1 * | 4/2016 | Szedo | ................ H04N 5/23254 |
| 2007/0013776 A1 * | 1/2007 | Venetianer | ............. H04N 7/181 |
| | | | 348/143 |
| 2010/0026802 A1 * | 2/2010 | Titus | ................ G08B 13/19613 |
| | | | 348/143 |
| 2017/0006349 A1 | 1/2017 | Song et al. | |
| 2017/0108347 A1 | 4/2017 | Zhu et al. | |
| 2017/0287437 A1 * | 10/2017 | Korzunov | ............... G06F 16/51 |

OTHER PUBLICATIONS

Extended European Search Report for International Application No. 18163983.2 dated Jul. 2, 2018, 11 pages.
www.fileformat.info:, JPEG Crompression, Nov. 22, 2017, XP55481781, Retrieved from the Internet: URL:https://web.archive.org/web/20171122183351/https://www.fileformat.info/mirror/eg ff/ch09_06. htm, 8 pages, retrieved on Jun. 6, 2018.

* cited by examiner

Primary Examiner — Delomia L Gilliard
(74) Attorney, Agent, or Firm — Cantor Colburn LLP

(57) ABSTRACT

A method of obtaining an image tile from a server by a client includes a client submitting a request to a server for extracting an image tile from a compressed image file. The server controls access to the compressed image file, the compressed image file contains multiple different resolution image layers and the image tile is to be extracted from one of these image layers. The request includes the identity of the image layer and the coordinates of the image tile in the image layer. The server extracts the requested image tile directly from the image layer in the compressed image file using the request and transfers image tile to the client at the decompressed image resolution and quality such that the image tile can be displayed on a display of the client.

15 Claims, 3 Drawing Sheets

US 10,956,488 B2

IMAGE TILE REQUEST SERVICE

FOREIGN PRIORITY

This application claims priority to European Patent Application No. 18163983.2 filed Mar. 26, 2018, the entire contents of which is incorporated herein by reference.

TECHNICAL FIELD

This disclosure relates to a method of and a system for requesting and downloading an image from a server to a client.

BACKGROUND

Aerial images are used for a variety of purposes such as surveying. Such aerial images are typically captured from an airborne platform such as a drone and then stored on disk (or in the cloud), e.g. in a compressed format. A stored image may then be accessed by a client via a server such that a user of the client machine is able to view the image.

The stored images are typically very large and so when a user of the client machine makes a request for an image, this may require large amounts of data to be transferred from the server to the client in order to download the image, once the requested image has been located by the server. Invariably this takes a long time for the user to receive, and be able to view, the images at the resolution they desire.

One option is to download the whole of a compressed image file from the server to the client and then decompress the image file, before displaying the part of the image the user wishes to view. However, this requires a large amount of data to be downloaded and then decompressed, even though the user may not wish to view the entire image. Both downloading and decompressing the image file takes a finite amount of time which results in a large delay between the image being requested and being able to be viewed. This process can be sped up by the server employing a tile cache, such that tiles of images which have been requested by a client previously are available more readily for downloading subsequently. Furthermore, such image tiles may be decompressed for storing in the cache such that these pre-computed tiles are available for downloading. An extension of this approach is for the server to pre-compute all tiles at all possible resolutions and store them in the tile cache ready for retrieval even before any single tile request has been made.

Another option is to use a streaming protocol (e.g. JPEG 2000 Interactive Protocol (JPIP)) that uses tile evolution. This first downloads a low quality version of the requested image that can be viewed relatively quickly. A higher quality version of the image is also downloaded such that the lower quality image is updated to be displayed in higher quality. However, the higher quality image takes longer to download and so there is still a delay in being able to view the image at the desired quality.

SUMMARY

According to this disclosure, there is provided a method of obtaining an image tile from a server by a client. The method includes a client submitting a request to a server for extracting an image tile from a compressed image file. The server controls access to the compressed image file, the compressed image file comprises a plurality of different resolution image layers and the image tile is to be extracted from one of the plurality of different resolution image layers, and the request comprises the identity of the image layer that the image tile is being requested from and the coordinates of the image tile in the image layer. The method also includes the server extracting the requested image tile directly from the image layer in the compressed image file using the identity of the image layer and the coordinates of the image tile in the request. The step of extracting the requested image tile comprises decompressing the requested image tile to a particular image resolution and quality. The method also includes transferring the decompressed image tile from the server to the client at the decompressed image resolution and quality.

Also according to this disclosure, there is provided a client for requesting an image tile. The client includes processing circuitry configured to submit a request to a server for extracting an image tile from a compressed image file to which access is controlled by the server, wherein the compressed image file comprises a plurality of different resolution image layers and the image tile is to be extracted from one of the plurality of different resolution image layers, and wherein the request comprises the identity of the image layer that the image tile is being requested from and the coordinates of the image tile in the image layer. The processing circuitry is also configured to receive the requested image tile from the server to the client, wherein the image tile received comprises a decompressed image tile which has been decompressed by the server to a particular image resolution and quality.

Also according to this disclosure, there is provided a server for extracting an image tile from a compressed image file, the server comprising processing circuitry configured to: receive a request for an image tile to be extracted from a compressed image file to which access is controlled by the server, wherein the compressed image file comprises a plurality of different resolution image layers and the image tile is to be extracted from one of the plurality of different resolution image layers, and wherein the request comprises the identity of the image layer that the image tile is being requested from and the coordinates of the image tile in the image layer. The circuitry is also configured to extract the requested image tile directly from the image layer in the compressed image file using the identity of the image layer and the coordinates of the image tile in the request, wherein the processing circuitry is configured to extract the requested image tile by decompressing the requested image tile to a particular image resolution and quality; and transfer the decompressed image tile from the server to the client at the decompressed image resolution and quality.

Also according to this disclosure, there is provided a client-server system for obtaining an image tile from a server by a client, the system comprising: a client for requesting an image tile; and a server for extracting an image tile from a compressed image file. The client comprises: processing circuitry configured to: submit a request to a server for extracting an image tile from a compressed image file to which access is controlled by the server, wherein the compressed image file comprises a plurality of different resolution image layers and the image tile is to be extracted from one of the plurality of different resolution image layers, and wherein the request comprises the identity of the image layer that the image tile is being requested from and the coordinates of the image tile in the image layer. The processing circuitry is also configured to receive the requested image tile from the server to the client, wherein the image tile received comprises a decompressed image tile which has been decompressed by the server to a particular image resolution and quality. The server comprises processing circuitry configured to: receive a request for an image tile to be extracted from a compressed image file to which access is controlled by the server, wherein the compressed image file comprises a plurality of different resolution image layers and the image tile is to be extracted from one of the plurality of different resolution image layers, and wherein the request comprises the identity of the image layer that the image tile is being requested from and the coordinates of the image tile in the image layer; extract the requested image tile directly from the image layer in the compressed image file using the identity of the image layer and the coordinates of the image tile in the request, wherein the server processing circuitry is configured to extract the requested image tile by decompressing the requested image tile to a particular image resolution and quality; and transfer the decompressed image tile from the server to the client at the decompressed image resolution and quality.

This disclosure relates to a method, a client, a server and a client-server system for obtaining an image tile from a server by a client. This on-demand image tile request service operates by the client submitting a request to the server for extracting an image tile from the original compressed image file, with access to the compressed image file being controlled by the server. The compressed image file is of a format that has multiple layers of different resolutions and the requested image tile is extracted from one of these resolution layers (with, e.g., the image tile forming a portion of the image layer). The request from the client includes the identity of the resolution layer from which the image tile is to be extracted and the coordinates of the image tile in this image layer.

Upon receiving the request, the server extracts the image tile requested directly from the image layer identified in the request, using the coordinates of the tile supplied in the request. The requested image tile is extracted by decompressing the image data in the compressed image file which corresponds to the requested image tile from the image layer identified in the request. The image data is decompressed to a particular (e.g. performant) image resolution and quality. The decompressed image tile is then downloaded from the server to the client at the image resolution and quality as it was extracted (i.e. as it was decompressed). The client is then able to use this image tile, e.g. for the purposes of display.

It will be appreciated that by decompressing, on demand, the requested image tile, only the image data that is required by the client is decompressed and downloaded. This minimises the amount of data to be decompressed and downloaded, thus minimising the time taken from the request being submitted by the client to the image tile being downloaded completely (such that the image tile is able to be displayed at this image quality). The client exploits, in the format of the request, the compressed image file being stored as multiple different resolution image layers, such that an appropriate resolution layer of the compressed image may be targeted for extracting the image tile according to the resolution and image quality desired by the client, e.g. in an optimum and performant manner.

Decompressing the requested image tile on demand also means that the server does not need to employ a cache associated with the storage of the compressed image file and thus the server does not need to pre-compute and store tiles. Indeed, the tile to be extracted may not exist already but rather is simply an area of the compressed image file which is then extracted. This means that there need be no storage overhead for such pre-computed (and often decompressed) tiles. Also, as discussed below, it may also allow the processing of the tile server to be scaled to improve its performance.

Formulating the request for the image tile is the responsibility of the client. The structure and organisation of the tiles in the file is implicit (e.g. top-left origin) but the organisation of the display is not imposed on the client, i.e. by the server and the way in which the compressed image files are stored. The client is therefore able to request the tiles in a manner of its choosing, giving it flexibility for how it may then organise and display the image tiles. For example, in a suite of images forming a scene, the client may wish to display the images in a multi-frame view, superimposing tiles from various images onto a canvas as and how the client wishes (e.g. to create a mosaic view).

Furthermore, owing to the minimum amount of data being downloaded (which may comprise only a small part of the (often very large) compressed image file), the image tile is able to be displayed at the desired resolution and/or quality (e.g. the quality to which the image tile was decompressed) quasi-instantaneously (typically within a few milliseconds), without having to first display a lower quality version while high quality data are decompressed. Owing to the client requesting the specific resolution layer from which to extract the image tile, e.g. appropriate to the resolution and/or quality at which the image tile is desired to be displayed, the amount of data to be downloaded may be relatively constant for different image tiles that are requested, e.g. independent of the areal extent of the tile in the compressed image file.

This way of extracting an image tile directly from the compressed image file is possible owing to the client identifying in the request the layer of the image and the coordinates in this layer from where the image tile is to be extracted. This enables the tile that has been requested to be found and extracted at the resolution that is desired to be transferred (and, e.g., displayed), and can be specific to each image tile and compressed image file.

In some examples, prior to the client submitting the request to the server, the method comprises (and the client's processing circuitry is configured to) generating a request for extracting an image tile from a compressed image file to which access is controlled by the server. For example, the client may be configured to know how to request an image tile based on the format of the compressed image file which, as discussed below, the client may discover from meta-data associated with the compressed image file. The client may know or find out, for example, where the origin of the compressed image file is, how many pixels the compressed image file has, etc.

In at least some examples, the request is generated using meta-data associated with the compressed image file (and thus the compressed image file may have meta-data associated with the file). This may help the client to determine the information to be contained in the request, e.g. owing to the meta-data comprising information relating to the properties of the compressed image file and the information in the request being specific to each compressed image file, for example. Thus, the method may comprise the client (with the client's processing circuitry being configured to) determining, from meta-data associated with the compressed image file, the coordinates of the image tile in the image layer.

The identity of the image layer that the image tile is being requested from may be determined from the zoom desired to be applied to an image by the client. For example, each time the zoom is doubled or halved, a higher or lower resolution layer respectively is required.

In order to obtain the meta-data associated with the compressed image file, the method may comprise the client (with the client's processing circuitry being configured to) submitting a request to the server for meta-data associated with a compressed image file; and the server (with the server's processing circuitry being configured to) retrieving the requested meta-data directly from the compressed image file, and transferring the retrieved meta-data from the server to the client. The method may also comprise generating the request for the meta-data, e.g. based on the results of a search.

The meta-data may comprise, inter alia, information relating to one or more of: the number of images in the compressed image file, the geographical coordinates (e.g. of a (e.g. top-left and/or bottom-right) corner) of the compressed image file, the georeferencing transform of the compressed image file, the size (e.g. in pixels) of the compressed image file, the pixel origin (e.g. top-left corner) of the compressed image file, the organisation (e.g. top-left corner to bottom-right corner) and the different resolution image layers of the compressed image file. This meta-data provides the client with information regarding the format of the compressed image file which may then be used by the client to determine the information contained in the request for an image tile that is submitted to the server.

For example, the information relating to the size (e.g. in pixels) of the compressed image file, its origin (e.g. top-left corner) and/or its organisation (e.g. top-left corner to bottom-right corner) in the meta-data may be used by the client to determine the coordinates of the (e.g. top-left corner of the) image tile in the image layer, e.g. by using one or more of these variables in the meta-data to first determine how many different resolution layers are required to form the entire image and/or how many image tiles are in each image layer in the compressed image file. The factor of the zoom applied to an image may be used to determine the identity of the image layer that the image tile is being requested from. For example, each time the zoom is increased or decreased by a factor of 2, the next (higher or lower) resolution layer is required to be requested.

The request for the image tile may comprise (and, e.g., be generated and/or submitted in) any suitable and desired format, e.g. according to a format mutually recognised by both the client and the server.

In some examples the compressed image file is stored as a container comprising a plurality of compressed images. Thus, in some examples the request comprises the identity of the image that the image tile is being requested from (e.g. the number of the image in the compressed image file container), as well as the identity of the image layer that the image tile is being requested from and the coordinates of the image tile in the image layer. Furthermore, references herein to properties of the compressed image file (e.g. its size (e.g. in pixels)) may instead relate to an image in the compressed image file container.

The plurality of compressed images in a compressed image file container may together form a composite (e.g. aerial) image. Thus the plurality of compressed images may comprise overlapping (e.g. aerial) images.

The coordinates of the image tile in the image layer in the request may comprise the x, y coordinates (e.g. of the top-left) of the image tile in the image layer. Thus in some examples the request is in the format NZXY, where N is the identity of the compressed image in the container, XY are the coordinates of the image tile in the image layer (e.g. X is a column, Y is a row) and Z is the identity of the image layer that the image tile is being requested from (e.g. the different resolution layers may simply be numbered), with, e.g., all ordinates starting at zero for the first row, column or layer respectively.

In some examples the request comprises a Hypertext Transfer Protocol (HTTP) request. In one example the compressed image file (or a container of a plurality of compressed images) is stored according to the National Imagery Transmission Format (NITF). Thus, in one example the request comprises the form ..filename/{N}/{Z}/{X}/{Y}.tif, where "filename" is the name of the compressed image file on the server, N is the image within the file (there may be multiple images but if not, this will be zero), Z is the resolution layer (typically between 0 and 6), X is the pixel column (e.g. labelled 0 upwards) and Y is the pixel row (e.g. labelled 0 upwards). The "tif" suffix is the format of the returned image tile.

In some examples the meta-data associated with a compressed image file may be requested in a similar manner to the image tile. Thus a request for the meta-data associated with a compressed image file may comprise the form ..filename/metadata.dat.

In some examples a histogram may be computed from, and associated with, the compressed image file (or from the image in the compressed image file container). The histogram may comprise statistical information relating to the image data in the compressed image file, e.g. pixel intensity distributions. The histogram associated with a compressed image file may be requested in a similar manner to the image tile. Thus the method may comprise the client (with the client's processing circuitry being configured to) submitting a request to the server for a histogram associated with a compressed image file; and the server (with the server's processing circuitry being configured to) retrieving the requested histogram directly from the compressed image file, and transferring the retrieved histogram from the server to the client. A request for the histogram associated with a compressed image file may comprise the form ..filename/N/Z/histogram.dat.

The meta-data and/or the histogram may be requested and retrieved independently of an image tile from the compressed image file.

The compressed image file, comprising a plurality of different resolution layers, may be any suitable and desired type of compressed (e.g. digital) image file. As outlined above, the compressed image file (or a container of a plurality of compressed images) may be stored according to the National Imagery Transmission Format (NITF). In some examples the compressed image file represents aerial imagery, e.g. captured from an airborne platform, e.g. using a dual-band 110 inch focal length image sensor. In some examples the compressed image files comprise JPEG2000 (e.g. NITF) files, though other file formats may also be used.

The JPEG2000 standard enables imagery to be compressed highly using the J2K codec and stored in image files (e.g. NITF). Compressed image files according to this standard are stored as multiple layers each of different resolution, such that image data at a particular resolution may be extracted from one of the layers. Moreover, the J2K standard allows image layers to be stored at different qualities, which allows image data at a particular quality to be returned. In some examples, the server is configured such that image tiles from a particular resolution layer can be returned at a particular quality. This helps to optimise the performance of the system, when quality may not be as important (e.g. for overview layers or when greater speed is required).

The request from the client may not always contain the identity of an image layer that exists (at that resolution) in the compressed image file. For example, the requested image layer may be at a lower resolution than those available. In this example, the method may comprise (and the server processing circuitry may be configured to), when the request comprises an image layer at a resolution that is not present in the compressed image file, computing the requested image tile from other image layers (whose resolution does exist) in the compressed image file.

The image tile to be extracted from the image layer may be any suitable and desired type of image tile. In at least some examples the image tile is rectangular, e.g. square. In one example the image tile has a size of 512 by 512 pixels, though the server could be configured to return other sizes of image tile, e.g. 256 by 256 pixels.

The compressed image file may have access to it controlled by the server in any suitable and desired way. In one example the server stores the compressed image file(s) in a memory (e.g. on (e.g. a disk on) the server). In another example the compressed image file(s) are stored in distributed memory, e.g. across multiple different disks, e.g. in the cloud. In each case, the (processing circuitry of the) server is arranged to be able to access the desired compressed image file (wherever it may be stored) such that the desired image tile may be extracted.

Once the server has received the request for the image tile from the client, the server extracts the image tile requested directly from the image layer that has been identified in the compressed image file by the request, using the coordinates of the image tile (e.g. the top-left corner) supplied in the request. The extraction of the image tile from the image layer of the compressed image file therefore generates the tile, at the desired resolution. In some examples, the method does not require or use pre-computed image tiles, and so, for example, no server cache storage is required or used. Therefore, in at least some examples, the server does not comprise a cache, e.g. for the storage of tiles. Thus, for example, the server does not store pre-computed (e.g. decompressed) image tiles, e.g. the image tile is extracted and transferred straight to the client by the server at the desired resolution, such that it may be displayed straight away.

In some examples, the method and the system do not cache any intermediate products. This enables multiple instances to exist without incurring concurrent write issues. In at least some examples, the system comprises an HTTP cache, at any suitable and desired point in the server-client chain. Thus, in these examples, the method takes advantages of ubiquitous HTTP caching, wherever it may exist. In some examples, when the client has access to a plurality of servers through a proxy, this HTTP caching means tiles from a single image may be cached from multiple servers simultaneously.

The processing circuitry of the server may comprise a plurality of processing units (e.g. arranged to operate in parallel with each other). This helps to increase the speed at which the image tile may be extracted by the server and transmitted to the client. Furthermore, with the absence of a server-side cache, the processing circuitry is not disrupted by cache reads and writes or request contention (parallel requests for the same tile possibly resulting in simultaneous writes from multiple servers), and so can be devoted to extracting and transmitting the requested image tile.

In some examples, the method is parallelised and the system comprises multiple instances of the server. The multiple servers may be HTTP load-balanced (e.g. using NGINX). This enables extreme demand on the server to be shared which helps to prevent bottlenecks, further improving the performance of the system and method.

Once the image tile has been extracted by the server, the decompressed image tile is transferred from the server to the client. The decompressed image tile is transferred from the server to the client at the image resolution and quality to which the image tile was requested and decompressed. In at least some examples, only a single version of the image tile is transferred, e.g. only at a single image quality (e.g. as configured by the server). Thus, for example, there is not a subsequent transfer of another version of the image tile (e.g. at higher quality).

The client is then able display the image tile on a display of the client (e.g. the client may comprise a display arranged to display the transferred image tile). Thus, in at least some examples, the client comprises graphics processing circuitry configured to display the image tile on the display associated with the client. The client may choose to display the transferred image tile at any suitable and desired resolution, e.g. within a factor of two from the resolution of the image layer from which the image tile was extracted. When the image on the display of the client is zoomed to a resolution greater than a factor of two from the resolution of the requested image tile, the client may request a tile at the new resolution.

In at least some examples the client comprises a memory, e.g. a local cache to the processing circuitry of the client, for storing the image tile requested and transferred from the server. This may enable the client to display the same image tile again without having to request the image tile from the server again, e.g. should it be requested by a user, resulting in such an image tile being able to be displayed quicker in such circumstances. In some examples the cache comprises a web (HTTP) cache, e.g. associated with processing circuitry of the client. However, as outlined above, the system may comprise a web (HTTP) cache at any suitable and desired location in the server-client chain (e.g. on the client or on any proxy or intermediate computer on the HTTP route).

A client may request and download multiple image tiles, e.g. for a user to view an aerial image over an area larger than a single tile. In such examples, the client may join together multiple image tiles which have been requested and downloaded (and, e.g., stored in the cache of the client). As the structure and organisation of the image tiles is not being imposed on the client (e.g. the organisation of the image tiles is implicit (e.g. top-left to bottom-right), e.g. by the server, the client may organise (e.g. the image tiles into) an image as is suitable and desired, e.g. using the graphics processing circuitry. In particular, the tile coordinate system is not pre-described for all tiles in a composite scene, e.g. as is the case for Web Mercator map tiles. The coordinate system within a stored compressed image is fixed; however, how the client maps the tiles into a larger (e.g. composite) picture is not.

In embodiments, the system (and the client and/or server) may comprise, and/or may be in communication with, one or more memories and/or memory devices that store the data described herein (e.g. the compressed image files, the extracted image tiles, the meta-data and/or the histograms), and/or store software for performing the processes described herein. The system (and the client and/or server) may comprise, and/or may be in communication with, a host microprocessor and/or a display for displaying the acquired aerial images and the reference aerial images.

The memory or memories referred to herein may be any desired and suitable memory of or for the system, the client and/or the server. The memory may be, for example, main system memory. The memory may be external to the data processing system (e.g. a distributed memory).

The method may be performed in any suitable and desired way and on any suitable and desired platform. In some examples the method of obtaining an image tile from a server by a client is a computer implemented method, e.g. the steps of the method are performed by processing circuitry.

The methods in accordance with the present disclosure may be implemented at least partially using software, e.g. computer programs. It will thus be seen that the present disclosure may also provide computer software specifically adapted to carry out the methods described herein when installed on a data processor, a computer program element comprising computer software code portions for performing the methods described herein when the program element is run on a data processor, and a computer program comprising code adapted to perform all the steps of a method or of the methods described herein when the program is run on a data processing system.

The present disclosure also extends to a computer software carrier comprising such software arranged to carry out the steps of the methods of the present disclosure. Such a computer software carrier could be a physical storage medium such as a ROM chip, CD ROM, DVD, RAM, flash memory or disk, or could be a signal such as an electronic signal over wires, an optical signal or a radio signal such as to a satellite or the like.

It will further be appreciated that not all steps of the methods of the present disclosure need be carried out by computer software and thus from a further broad example the present disclosure provides computer software and such software installed on a computer software carrier for carrying out at least one of the steps of the methods set out herein.

The present disclosure may accordingly suitably be embodied as a computer program product for use with a computer (e.g. data processing) system. Such an implementation may comprise a series of computer readable instructions either fixed on a tangible, non-transitory medium, such as a computer readable storage medium, for example, diskette, CD ROM, DVD, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic or optical, or transmitted using any communications technology, present or future, including but not limited to optical, infrared or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

BRIEF DESCRIPTION OF DRAWINGS

One or more non-limiting examples will now be described, by way of example only, and with reference to the accompanying figures in which.

DETAILED DESCRIPTION

Aerial images are used for a variety of purposes such as surveying. Such aerial images are typically captured from an airborne platform such as a drone and then stored on disk or in the cloud as compressed image files. When a user operating a client computer wishes to view part of an aerial image that is stored on a server computer as a compressed image file, the client has to submit a request for the aerial image to the server, such that the aerial image may be downloaded to the client for the user to view. An example of how this may be performed will now be described.

Figure 1:
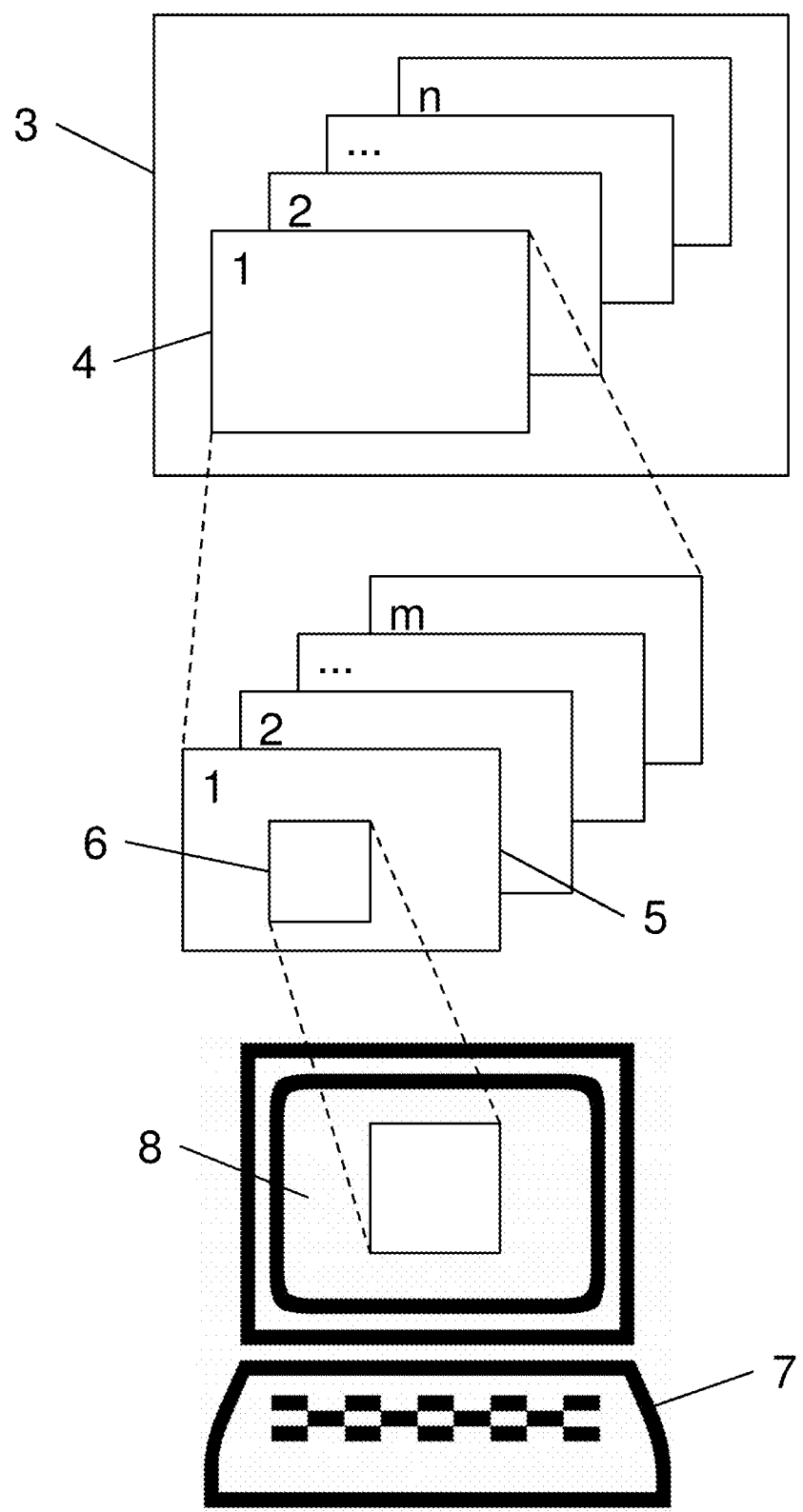
FIG. 1 shows schematically an image tile being extracted from a compressed image file.

FIG. 1 shows schematically an image tile 6 being extracted from a compressed image file 3. The compressed image file 3 is stored using a server (as will be described below with reference to FIG. 2) as a compressed image file container 3 which contains multiple images 1, 2 . . . n. As shown for one of the images 4, each of the images comprises multiple layers 1, 2 . . . m each having a different resolution (for example, the compressed image file 3 may be a NITF file containing images 1, 2 . . . n in JPEG2000 compressed format, containing resolution layers 1, 2 . . . m at various levels of image quality).

An image tile 6, as requested by a client computer 7, may be extracted from one of the layers 5 of the images 4, such that it can then be displayed on the display 8 of the client computer 7.

Figure 2:
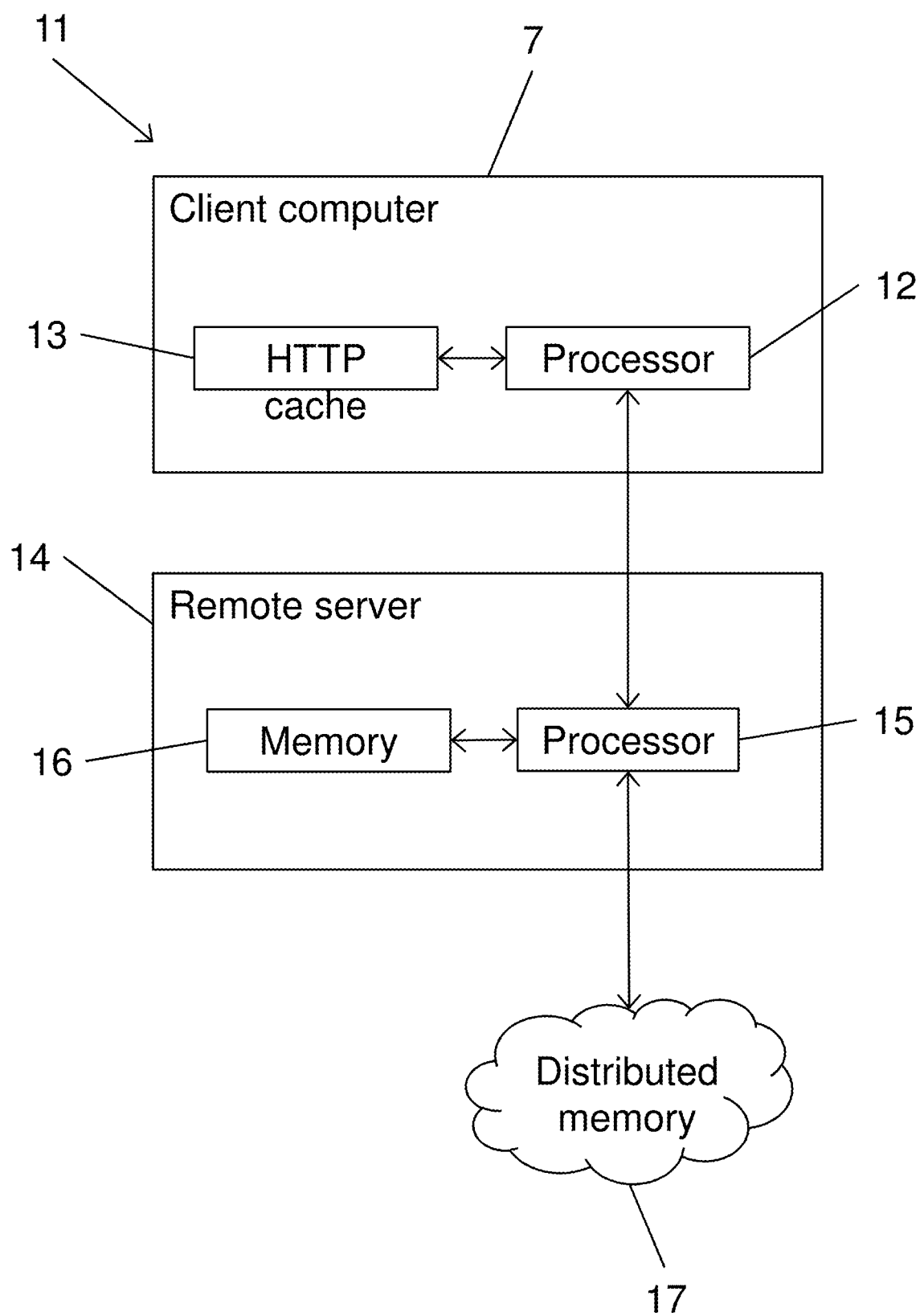
FIG. 2 shows schematically a system for extracting an image tile from a compressed image file.

FIG. 2 shows schematically a system 11 for extracting an image tile from a compressed image file, in the manner shown in FIG. 1. The system includes a client computer 7 (e.g. as shown in FIG. 1) and a remote server 14. The client computer 7 includes a processor 12 which is configured to be able to request image tiles from the server 14 and a web (HTTP) cache 13 in which image tiles that have been downloaded from the server 14 may be stored locally, at least temporarily.

The remote server 14, which is connected to the client computer 7, includes a processor 15 and a memory 16. The processor 15 controls access to compressed image files stored in the memory 16, such that image tiles requested by the client computer 7 may be extracted by the server 14 and downloaded to the client computer 7. The remote server 14 may also control access to a distributed memory 17 in the cloud which also stores compressed image files. The remote server 14 does not include a cache for the purposes of storing decompressed image files, e.g. locally to the processor 15.

Figure 3:
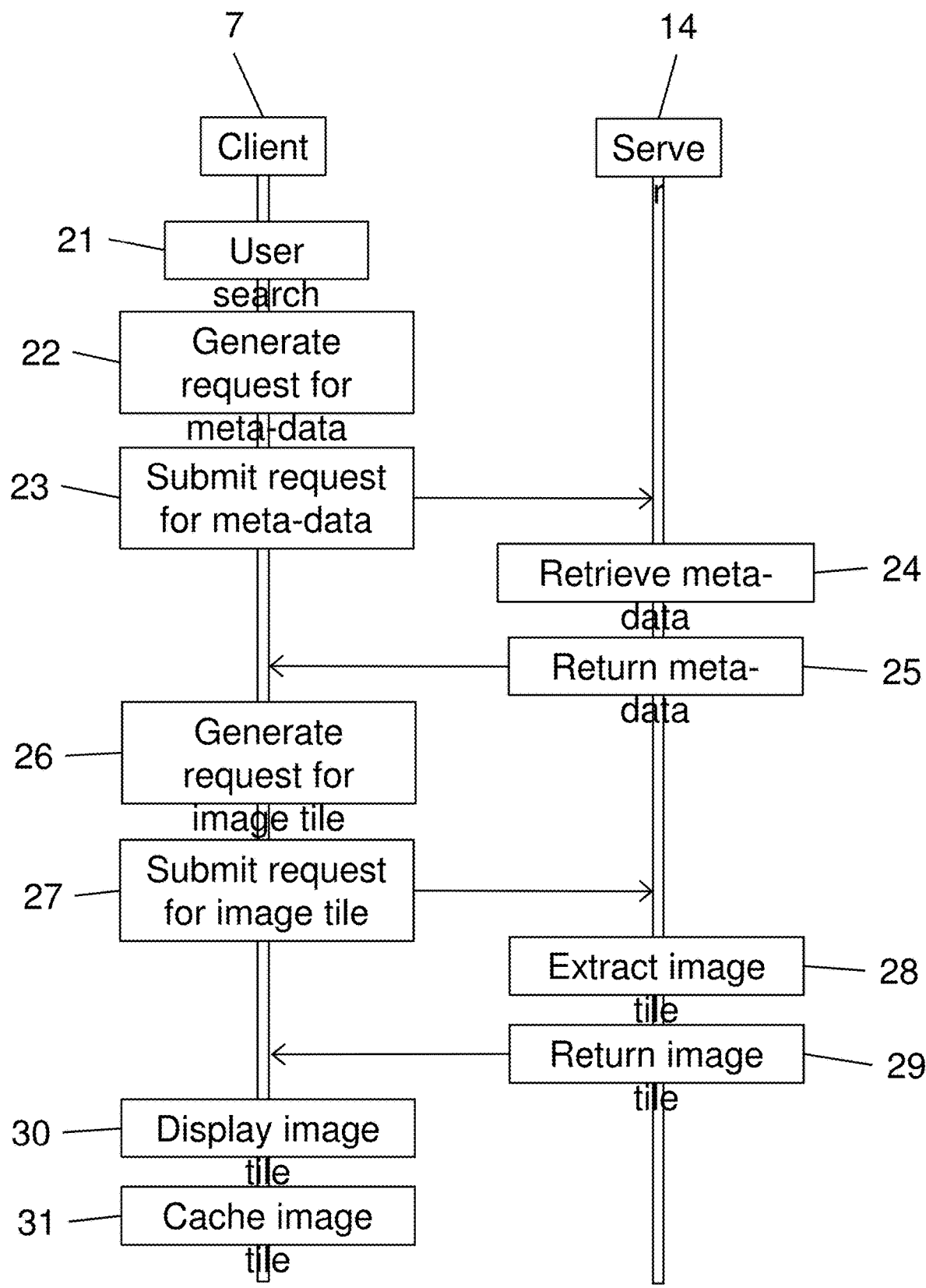
FIG. 3 shows a flow chart of the process of extracting an image tile from a compressed image file as shown in FIG. 1 using the system shown in FIG. 2.

Operation of the system shown in FIG. 2 when obtaining an image tile as shown in FIG. 1 will now be described with reference to FIG. 3. FIG. 3 shows a flow chart of the process of extracting an image tile from a compressed image file as shown in FIG. 1 using the system shown in FIG. 2.

When a user of a client computer 7 wishes to view a part of an aerial image, first they perform a search using various data fields (e.g. geographical coordinates, a place name, a geographical feature, etc.) to determine the location of the feature the user is searching for (step 21, FIG. 3). Based on this search, the client computer 7 generates a request of the form http://host:port/tileSservice/{filePath}/metadata.dat to request the meta-data of the compressed image file container 3 which contains the searched for location (step 22, FIG. 3). This request is then submitted by the client computer 7 to the remote server 14 (step 23, FIG. 3).

The remote server 14, upon receiving the request from the client computer 7, retrieves the requested meta-data from the compressed image file container 3 (step 24, FIG. 3) and returns the meta-data to the client computer 7 (step 25, FIG. 3).

Using the meta-data from the compressed image file container 3 (which, e.g., contains the geographical coordinates, the georeferencing transform, the size (e.g. in pixels) of the images, the origin (e.g. top-left corner) of the compressed image file, the organisation (e.g. top-left corner to bottom-right corner) and the different resolution image layers of the images), the client computer 7 generates a request of the form http://host:port/tileSservice/{filePath}/{N}/{Z}/{X}/{Y}.tif to request the image tile 6 from the compressed image file container 3 which contains the searched for location (step 26, FIG. 3). The request includes the identity (N) of the image 4 in the compressed image file container 3 on the remote server 14, the identity (Z) of the image layer 5 containing the image tile 6 at the resolution requested by the client 7 (which may be used by the client 7 to derive the resolution of the image tile eventually displayed) and the coordinates (X, Y) of the image tile 6 in the image 4. This request is then submitted by the client computer 7 to the remote server 14 (step 27, FIG. 3).

The remote server 14, upon receiving the request from the client computer 7, extracts the requested image tile 6 directly from the image 3 in the compressed image file container 3 (step 28, FIG. 3), stored on the memory 16 of the remote server 14 or in the distributed memory 17, using the details in the request from the client computer 7. The image tile 6 (e.g. 512×512 pixels) is extracted at the specified resolution (e.g. to satisfy the required display resolution on the client computer 7). The extraction of the image tile 6 includes decompressing the image tile 6 from the compressed image 4. The image tile 6 is decompressed to a particular image quality. The image quality that a particular resolution layer is decompressed to may be pre-configured on the server. The decompressed image tile 6 is then downloaded to the client computer 7 (step 29, FIG. 3).

The downloaded image tile 6 is then displayed on the display 8 of the client computer 7 (step 30, FIG. 3). The downloaded image tile 6 is also stored in the web (HTTP) cache 13 on the client computer 7 (step 31, FIG. 3), locally to the processor 12, such that if the user of the client computer 7 wishes to view the same image tile 6 again, the image tile 6 can simply be loaded from the cache 13 without having to be requested from the remote server 14. Although the HTTP cache 13 is shown in FIG. 2 on the client 7, it may exist on any proxy or intermediate computer on the HTTP route. Thus the process benefits from HTTP caching wherever it may occur.

The user is likely to want to view multiple different image tiles. Each image tile is requested and retrieved as outlined above, except when the user of the client computer 7 wishes to view an image tile already downloaded. In this case, the request is still submitted to the server 14 but the image tile can then simply be loaded from the cache 13 without having to be retrieved from the remote server 14 (unless the requested image tile has been cleared from the cache 13).

Thus, where the image tile 6 is retrieved from is invisible to the client 7, which does not therefore have to worry about the most efficient source of the tile.

In the same way as requesting the meta-data, the client computer 7 may also request histogram data (showing properties of an image 4 in the compressed image file container 3) from the remote server 14. In this case, the client computer 7 generates a request of the form http://host:port/tileSservice/{filePath}/N/Z/histogram.dat to request the histogram of the compressed image 4. This request is then submitted by the client computer 7 to the remote server 14, with the remote server 14 retrieving the requested histogram from the compressed image 4 and returning the histogram to the client computer 7.

The invention claimed is:

1. A method of obtaining an image tile from a server by a client, the method comprising:
submitting, with a client, a request to a server for extracting an image tile from a compressed image file,
wherein the server controls access to the compressed image file,
wherein the compressed image file comprises a plurality of different resolution image layers and the image tile is to be extracted from one of the plurality of different resolution image layers, and
wherein the request comprises an identity of the image layer that the image tile is being requested from and coordinates of the image tile in the image layer;
extracting, with the server, the requested image tile directly from the image layer in the compressed image file using the identity of the image layer and the coordinates of the image tile in the request,
wherein the step of extracting the requested image tile comprises decompressing the requested image tile to a particular image resolution and quality; and
transferring the decompressed image tile from the server to the client at the decompressed image resolution and quality.

2. The method as claimed in claim 1, wherein the method comprises the client generating the request for extracting the image tile from the compressed image file to which access is controlled by the server.

3. The method as claimed in claim 1, wherein method comprises the client the client submitting a request to the server for meta-data associated with a compressed image file; and the server retrieving the requested meta-data directly from the compressed image file, and transferring the retrieved meta-data from the server to the client.

4. The method as claimed in 1, wherein the method comprises the client generating the request using meta-data associated with the compressed image file.

5. The method as claimed in claim 1, wherein the method comprises the client determining, from meta-data associated with the compressed image file, the identity of the image layer that the image tile is being requested from and the coordinates of the image tile in the image layer.

6. The method as claimed in claim 3, wherein the meta-data comprises information relating to one or more of: a number of images in the compressed image file, geographical coordinates of the compressed image file, a georeferencing transform of the compressed image file, a size of the compressed image file, an origin of the compressed image file, an organisation of the compressed image file and the different resolution image layers of the compressed image file.

7. The method as claimed in claim 1, wherein the compressed image file is stored as a container comprising a plurality of compressed images.

8. The method as claimed in claim 1, wherein the request comprises a Hypertext Transfer Protocol request.

9. The method as claimed in claim 1 wherein the method further comprises:
the client submitting a request to the server for a histogram associated with a compressed image file; and
the server retrieving the requested histogram directly from the compressed image file, and transferring the retrieved histogram from the server to the client.

10. The method as claimed in claim 1, wherein the compressed image file is stored according to the National Imagery Transmission Format and contains one or more JPEG2000 files.

11. The method as claimed in claim 1, wherein the image tile has a size of 512 by 512 pixels.

12. The method as claimed in claim 1, wherein the client comprises a cache for storing the image tile requested and transferred from the server.

13. The method as claimed in claim 1, wherein the method does not use any server cache storage of pre-computed image tiles.

14. A client for requesting an image tile, the client comprising:
processing circuitry configured to:
submit a request to a server for extracting an image tile from a compressed image file to which access is controlled by the server,
wherein the compressed image file comprises a plurality of different resolution image layers and the image tile is to be extracted from one of the plurality of different resolution image layers, and
wherein the request comprises an identity of the image layer that the image tile is being requested from and coordinates of the image tile in the image layer; and
receive the requested image tile from the server, wherein the image tile received comprises a decompressed image tile which has been decompressed by the server to a particular image resolution and quality.

15. A server for extracting an image tile from a compressed image file, the server comprising processing circuitry configured to:
receive a request for an image tile to be extracted from a compressed image file to which access is controlled by the server,
wherein the compressed image file comprises a plurality of different resolution image layers and the image tile is to be extracted from one of the plurality of different resolution image layers, and
wherein the request comprises an identity of the image layer that the image tile is being requested from and coordinates of the image tile in the image layer;
extract the requested image tile directly from the image layer in the compressed image file using the identity of the image layer and the coordinates of the image tile in the request,
wherein the processing circuitry is configured to extract the requested image tile by decompressing the requested image tile to a particular image resolution and quality; and
transfer the decompressed image tile from the server to the client at the decompressed image resolution and quality.

* * * * *